United States Patent [19]

Salvadori

[11] Patent Number: 4,883,415

[45] Date of Patent: Nov. 28, 1989

[54] PRESS FOR TIRES AND AUTOMATIC DEVICE FOR RAPIDLY DISMOUNTING THE RELATIVE VULCANIZING MOLD

[75] Inventor: Bruno Salvadori, Cormano, Italy

[73] Assignee: Pirelli Coordinamento Pneumatici S.p.A., Milan, Italy

[21] Appl. No.: 124,966

[22] Filed: Nov. 24, 1987

[30] Foreign Application Priority Data

Dec. 1, 1986 [IT] Italy .................................. 22515 A/86

[51] Int. Cl.⁴ ........................ B29C 33/04; B29C 35/00
[52] U.S. Cl. .................................. 425/47; 425/DIG. 5
[58] Field of Search .................... 425/28.1, 39, 47, 54, 425/56, 25, 46, 182, 195, 32, 34.1, 35, 55, 57, DIG. 5

[56] References Cited

U.S. PATENT DOCUMENTS

| | | | |
|---|---|---|---|
| 3,458,612 | 7/1969 | Pacciarini et al. | 425/46 |
| 3,730,658 | 5/1973 | Marra | 425/46 |
| 3,779,677 | 12/1973 | Greenwood | 425/46 |
| 3,787,155 | 1/1974 | Zangl | 425/46 |
| 3,797,979 | 3/1974 | Greenwood | 425/46 |
| 3,833,323 | 9/1974 | Dasch | 425/47 |
| 3,854,853 | 12/1974 | Mirtain | 425/47 |
| 3,910,735 | 10/1975 | Caretta | 425/46 |
| 3,999,907 | 7/1976 | Pappas | 425/47 |
| 4,508,495 | 4/1985 | Beres et al. | 425/28.1 |
| 4,515,541 | 5/1985 | Salvadori | 425/46 |
| 4,580,959 | 4/1986 | Pizzorno et al. | 425/47 |
| 4,686,129 | 8/1987 | Yokoyama et al. | 425/47 |
| 4,726,749 | 2/1988 | Katsuma | 425/47 |

FOREIGN PATENT DOCUMENTS

| | | |
|---|---|---|
| 1040775 | 10/1958 | Fed. Rep. of Germany . |
| 2413682 | 9/1975 | Fed. Rep. of Germany ........ 425/47 |
| 1440604 | 2/1963 | France ................................... 425/47 |
| 1176162 | 1/1970 | United Kingdom . |

Primary Examiner—Willard Hoag
Attorney, Agent, or Firm—Birch, Stewart, Kolasch & Birch

[57] ABSTRACT

The present invention relates to a vulcanizing mold for elastomeric or plastomeric to toroidal articles, comprising, a first cheek and a second cheek being axially opposed to each other, the first cheek and the second cheek delimit the flanks of an article to be molded; and, a crown of radially contractile and expansible sectors interposed between the first cheek and the second cheek which delimit a radially outer surface of the article to be molded, the sectors comprising two connected pieces wherein a first connected piece is a matrix that has a radially inner surface substantially corresponding to a portion of the crown surface of the article to be molded, and a second connecting piece which is a support for the matrix that has a radially outer surface inclined with respect to an axis of the mold, the support having means for solidly locking the matrix onto the support and the matrix being freely movable with respect to a corresponding support in at least the axial direction along the coupling surface between the first connecting piece and the second connecting piece; the support and a corresponding matrix therefor being operatively associated with one another through at least one fixing device that is alternatively shiftable between two operative positions, a first operative position being a working position wherein the matrix is solidly locked on the support, and a second operative position being a rest position wherein the matrix and the support are freely movable with respect to one another.

10 Claims, 2 Drawing Sheets

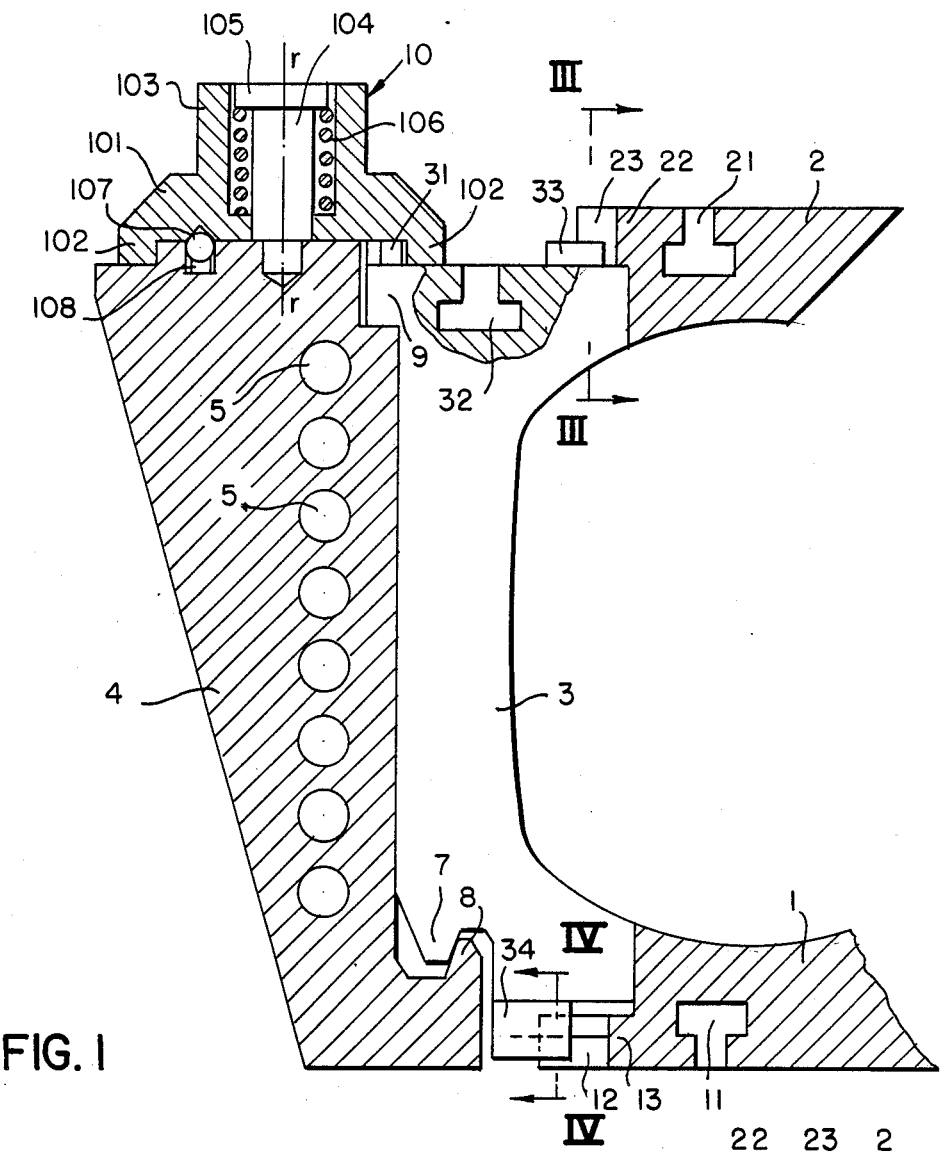
FIG. 1
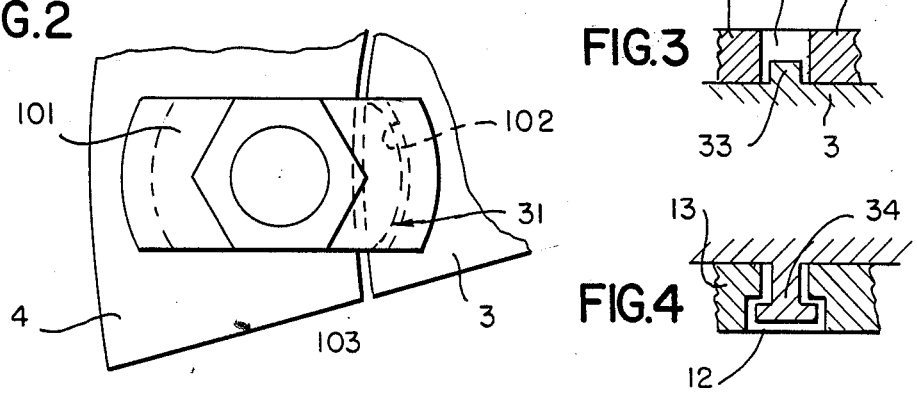
FIG. 2
FIG. 3
FIG. 4

PRESS FOR TIRES AND AUTOMATIC DEVICE FOR RAPIDLY DISMOUNTING THE RELATIVE VULCANIZING MOLD

SUMMARY

The present invention relates a centripetal type of mold which is easily mountable and dismountable, from a corresponding vulcanizing press, by utilizing automatic devices, the matrix of the sectors are blocked on the corresponding supports by a bayonet type of device mounted on the support, that is shifted from its blocked position, to a non-interference position with the matrix, by simply rotating it around its own axis, whilst the two cheeks fixed to the frame of the press, also fixed by bayonet connections, and the corresponding crown of sectors, with a shut mold, rsult as being interconnected with one another, so much so that the mold unit in its entire whole, can be shifted by acting just upon at least two diametrically opposed dies.

DESCRIPTION

The present invention concerns molding equipment for vulcanizing elastomeric or plastomeric toroidal articles, such as, for example, tires. More specifically, the present invention relates to vulcanizing molds, of the so-called centripetal type, that are actioned by a special press.

These molds that are, for that matter, already well-known, (as diverse from the equally known shell-like type of molds i.e. formed by two halves), comprise two axially opposed cheeks which delimit the flanks of the article to be molded, and a crown of radially contractile and expansible sectors, interposed in-between the cheeks, that delimit the radially outer surface of the article.

As is well-known to the one skilled in the art, and, as shall be defined in greater detail later on, the radial movement of the sectors is controlled by a ring, containing the sectors, that is solidly fixed onto the press upon which the mold is mounted, and to which the press bestows an axial movement with respect to the sectors. In particular, it must be remembered that said sectors are constituted by two pieces, solidly fixed to each other, i.e. the matrix bearing the pattern to be imprinted upon the article, and the support for the matrix itself, which connects the matrix to the ring, and determines its movement.

One of the most important problems linked with the use of this machinery is the substitution of the molds, that has to be effectuated each and every time the measurements of the article to be produced, or the pattern that has to be imprinted on the outer surfaces, is changed.

In the past, for effectuating the substitution, one had to wait for the machine to cool down before proceeding with dismounting manually substituting the mold. Then, the new mold had to be again manually re-mounted onto the press and finally, said machine had to be brought back to operating temperature, prior to recommencing with a new production cycle.

For the speeding-up of said operations, there have aleay been produced vulcanizing equipment, and in-particular by this Applicant, whereby the two cheeks of the mold as well as the sector-guide ring for the sectors contain means for allowing a rapid coupling and releasing with respect to the press, through devices generically definable as being of the "bayonet" type.

These devices work between two positions, respectively free and blocked, and they do not require any manual intervention of the operator upon the machine. Moreover, these devices can even be operated while the machine is still heated, so that actually, the operation of substituting the press molds, has turned into an easy operation that is rapidly effectuated and without involving any risk to the operator himself.

Nevertheless, said machines present a drawback linked with the fact that each vulcanizing mold has to be mounted and dismounted from the press along with the sector-guide ring. This operation itself implies a greater cost for the equipment concerned, as well as a greater weight to be transported, which negatively affects the cost for installing and running the above-mentioned vulcanizing press. Moreover, it has been noted that when a type of tire is diverse, what is required is a diverse matrix (although the support for the same could still be the same), within an ample field of dimensional values for the diverse matrices.

The Applicant has now invented a new type of equipment, which completely solves the problem faced, so much so that the aim of this present invention is a new vulcanizing mold, provided with rapid coupling devices for in this way and being easy to assemble and disassemble, and that can be dismounted from the press while leaving, permanently mounted on said press, the sector-guide ring together with the supporting elements for the matrices.

Hence, what forms the object of the present invention is a vulcanizing mould for elastomeric or plastomeric, toroidal articles, of the centripetal type, comprising two annular, coaxial and opposite slabs, defined as cheeks, disposed axially below and above respectively, substantially corresponding with the flanks of said article, axially shiftable one with respect to the other in both senses, and a plurality of radial sectors that are distributed circumferentially around said cheeks and coaxial with the same, which are radially shiftable in both senses, with respect to said cheeks, and axially shiftable in both the senses, with respect to at least one of the cheeks, with each sector comprising a matrix which presents its radially inner surface substantially corresponding to a portion of the crown surface of the article and a support of said matrix, presenting its radially outer surface inclined with respect to the axis of the mold, the mold being characterized by the fact that said support and said matrix are maintained and assembled together through at least one connecting device, that is alternatively shiftable between two operative positions, respectively a working position where said matrix is solidly blocked on said support, and an at a rest position where said matrix is freely shiftable, at least in the direction parallel to the mould axis, with respect to said support.

According to a preferred form of the invention, the device of the invention comprises a substantially rectangular bar, that is mounted on the upper and axially outer surface of said support, provided with at lease one end-peg on the surface turned towards said support, and provided with a pin, coaxial to said axis of rotation, on the axially opposite surface, with elastically deformable means being provided for maintaining said bar pressed axially against the axially outer surface of the support.

Correspondingly, the matrix presents upon its axially upper surface and in correspondence of its radially outer edge a stop-peg which is axially developed towards its outer side and which is apt for engaging with the end-peg of said bar, with said connecting device in its working position.

Preferably, the said two pegs have their corresponding, radially facing surfaces, concave and convex respectively; with the bending radius, of said concave surface, being greater than that of the convex surface.

Moreover, for allowing to effectuate the movement of the entire mold in its complex whole, in correspondence of the lower axially outer surface, the cheek and at least two of said matrices, are provided with a reciprocal coupling device which allows relative radial movements to take place, when the mould is shut, and prevents relative axial and circumferential movements from taking place, between said matrices and said cheek. With regards to the upper cheek, when the mould is shut, it extends in the radial direction over the axially outer upper surface of the matrix, with reciprocal coupling devices being foreseen, on said cheek and on at least one of said matrices, which allow for relative radial movements, and stop relative circumferential movements between said cheek and said matrices and eventually, at least two of said matrices, situated in diametrically opposed positions, present means for connecting them with a gripping device for allowing the movement, in the axial sense, of said mold.

The present invention will now be better understood, with the aid of the following description and the attached figures, given solely by way of a non-limiting example.

BRIEF DESCRIPTION OF THE DRAWINGS

FIG. 1 illustrates, in a straight section, a half portion of the mold, according to the invention, with it being understood that the other half portion is symmetrical with respect to the mold axis;

FIG. 2 illustrates, a top-view of the gripping device between support and matrix, in an opportune form of realization, in a working position;

FIGS. 3 and 4 illustrate, in a straight section, orthogonal to that of FIG. 1, and according to the planes III—III and IV—IV respectively, the gripping devices, for connecting the matrix to the upper cheek and with the lower cheek;

Figure 5:
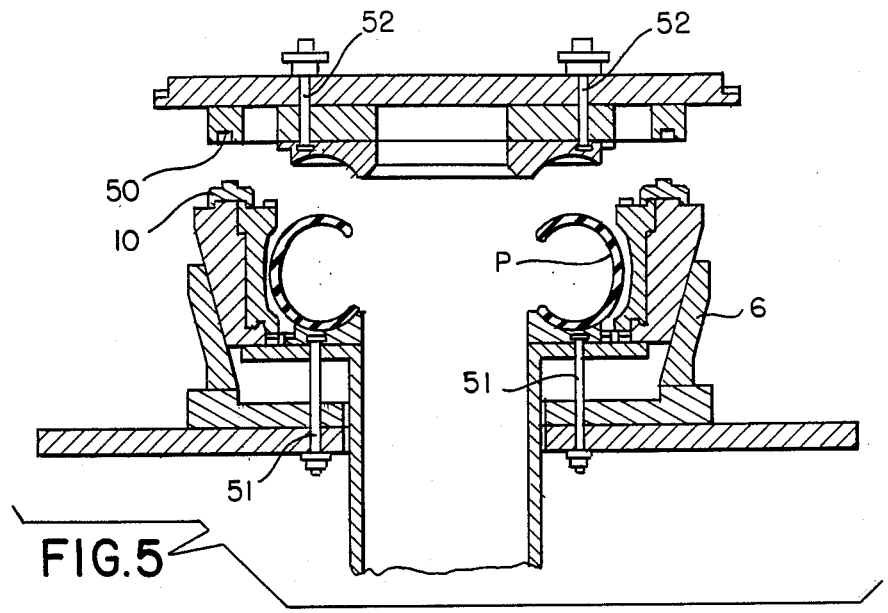
FIG. 5 illustrates, in a straight section, the mold of the invention during the vulcanizing cycle.

Hence, with reference to FIG. 1, the mold of the invention is the usual centripetal type of mold, modified as shall be described hereinbelow. The mold is subtantially comprised of two annular slabs, usually known and defined here, as lower cheek (1) and upper cheek (2), that are coaxial and axially opposed to each other, and substantially corresponding to the flanks of the toroidal article to be molded and vulcanized and, in this specific case, to the tire for vehicle wheels.

In a per se known way, the above-said cheeks are provided with a cavity (11, 21) apt for housing the head of a bayonet-type device, that effectuates the blocking of the cheeks on corresponding parts (not shown) of the press.

Around the above-said cheeks, there are disposed a plurality of sectors distributed circumferentially, and disposed coaxially, with respect to the cheeks, each one of which substantially comprises a matrix (3), the radially inner surface of which corresponds with a crown-portion of the above-cited article, and in particular, to the tread-band, and at least partially to the tire shoulders, and a support (4) on which the above-said matrix is mounted.

In particular, the support (4) can be provided with passages (5) for circulating the vapor, or, some other apt fluid, for heating the matrix during the vulcanizing operations.

The support (4), presents its radially outer surface shaped, according to an inclined plane, with respect to the mold axis, which transforms the reciprocal axial movement of the sector, with respect to a corresponding conjugated device, into a radial movement of the sector, with respect to the cheeks.

Usually, the conjugated device is a holder-ring (6), (see FIGS. 5 and 6), which presents, upon its radially inner surface, inclined surfaces corresponding and coupled with those of the sectors.

The type of mold identified here, is too well-known already, and hence, it does not require any further detailed explanations here with regard to its structure and/or its functioning. It is sufficient to remember that for enabling the loading into the mold, of the carcass to be vulcanized, for so imprinting the carcass and for unloading the finished product, these cheeks are axially shiftable, one with respect to the other; while the sectors are radially shiftable, with respect to both of these said cheeks, and axially shiftable with respect to at least one of the above-said cheeks.

To be able to substitute the molds on the vulcanizing presses according to the invention, by still leaving mounted on the press the holder-ring and the supporting matrix, which are substantially identical for all the moulds, the matrix must not be mounted on its support in a permanent and solid way, as is found in the machine of the state of the art, i.e. by using means that require difficult operations for their removal; but through devices that can easily be dismantled.

Hence, according to the invention, the coupling surface between the support and the matrix has a profile which allows, at least, for having the relative axial shifting between the two elements, with also guaranteeing an integral assembling between support and matrix during mold functioning.

Therefore, this profile is obtained with matrices that present, in their straight section, their substantially rectilineal, radially outer surface, as being parallel to the mold axis.

On its axially outer lower surface, the matrix is provided with a relief (7) that becomes lodged in a cavity originated by a corresponding relief (8) made on the lower axial portion of the support (4).

The relief (7) is tapered at its end, in such a way that the operation of fitting the matrix onto its corresponding support results as being guided and facilitated. Instead, the axially upper portion of the matrix, presents a flange (9) protruding radially with respect to its radially outer surface. Once mounted, the flanged portion results as resting on a corresponding conjugated step, made in the radially inner part of the support (4).

For blocking the matrix in the position for its being assembled with the support, said support is provided upon its axially upper outer surface, with a suitable fixing device (10), that comprises essentially: a clamping member (10) having a U-shaped channel section briding the matrix and the corresponding support surface, and also provided with a pin (103) in a barycentric position on its axially opposite surface.

The bar is freely rotating around an axis of rotation r—r, coaxial with the above-said pin, mounted orthogonally to the surface of the sector.

For convenience sake, the pin is axially perforated, but having two diverse diameters for these holes which are greater than that for the upper opening, so much so that the cavity for the pin acquires a bell-shaped form.

Inside said cavity, there is inserted a shaft (104), which is made solid with the support, for example, through screwing (as shown), and which has an enlarged head (105) that has substantially the same diameter as the aperture of the pin.

Inside said cavity, delimited by the bell-wall and the shaft-body, there is disposed, inserted on said shaft, a helicoidal spring (106) that operates under compression.

At this point it is quite obvious that the spring, fixed to bear against the enlarged head of the shaft, exercises a pressure against the base of the cup and substantially maintains the pin (103) and with it also the bar (101) pressed against the surface of the support.

For aiding the rotation of the bar, as will be seen later, it is apt for the pin to be prismatic, for example, with a hexagonal section, as precisely illustrated in FIG. 2.

It is clear that the rotation of the pin causes the rotation of the bar. It is also opportune to foresee means for the spontaneous prevention of the rotation of the pin.

An example of an easy realization for the said means is the one shown in FIG. 1, comprised substantially of a sphere (107) held pressed against a cavity, that is made in the lower surface of a bar (101), by a compressed spring (108) housed in a cavity made in the corresponding facing surface of the support.

The length of the rectangular bar (101) is such that, with the device (10) in its at rest position, it does not protrude radially outwards beyond the support in the direction of the matrix. When the device is in its working position (see FIGS. 1 and 2), it is taken over the axially upper surface of the matrix, thus blocking any axial shifting and also any rotation of the matrix with respect to the support.

In order to better guarantee this blocking, which is essential during the functioning of the mold while also maintaining the facility of rotation for the bar, even the axially upper surface of the matrix is provided with a peg and more precisely, a stop-peg (31), disposed at the edge of the flanged portion of the matrix, that is developed axially outwardly, so as to result inserted in-between the support and the end-peg (102).

The respectively facing surfaces of the two pegs (31 and 102) are curvilinear, concave and convex respectively; for convenience sake, said convex surface of the peg (102) (see FIG. 2), has a greater bending radius than the concave surface of the peg (31), for so fostering the reciprocal opening of the pegs, in the instance of small disalignments, between matrix and sector, that may be verified during the phase of mounting the mold on the press.

Again in the axially upper portion of the matrix, there is also foreseen a connecting means, having an apt gripping device, in the illustrated case a circular cavity (32) with a coaxial elliptical aperture apt for receiving an elliptical head, supported by a corresponding shaft, (already known in tire technique), with the aim of allowing to axially move the matrix with respect to its support.

In other words, the movement of the mold could be effectuated through a suitable mobile equipment disposed above the press provided with at least two, but preferably with not less than three shafts, oriented axially, and rotating around their own axis, and provided with an elliptical head which has to be inserted into the above-said cavity of corresponding matrices.

For being able to effectuate the transportation of the mold with only gripping the matrices, it is therefore necessary for the matrices to be fixed in some way, to the cheeks with fixing means that later on do not prevent the necessary relative movements, in-between matrices and cheeks, during the phase of the mold functioning.

The relative opportune devices are illustrated in FIGS. 3 and 4. These devices also guarantee the correct assembling of the mold during the manual operations carried out at the work bench, i.e. during the assembling between matrices and cheeks, that are effectuated for predisposing the mold for the successive mechanized transport and for its mounting on the press.

FIG. 3 shows the fixing device for the matrices and the upper cheek that is realized through making at least one radial groove (23) in the flanged edge (22) of the cheek (2), inside which is housed the peg (33) found on the outer, axially upper surface of the matrix.

It is obvious that said peg does not prevent the necessary relative radial shiftings between matrices and cheek; whilst it stops any whatsoever circumferential (rotational) shifting of the cheek, respecting the matrices.

Instead, FIG. 4 illustrates a convenient form of attuation of the device for said fixing between the matrix (3) and the lower cheek (1). This device is realized by making at least two grooves (12), in a diametrically opposed position, in an upturned-T form, at the flanged edge (13) of the cheek (1), and with corresponding pegs (34), in an upturned-T form, protruding axially from the lower surface of the matrix (3), inserted into the grooves.

Even in such a case, it is noted that the radial movement of the matrix, with respect to the lower cheek, is not found to be impeded; while, when the mold is shut, or about to be shut, they result as being impeded (i.e. when the peg (34) has already entered the groove (12)), not just circumferential shiftings of the cheek (1), with respect to the matrix (3), but any whatsoever axial relative shifting as well, in-between the cheek and matrix.

Now that the device in its complex whole has been noted, we can pass on to considering its functioning.

Figure 6:
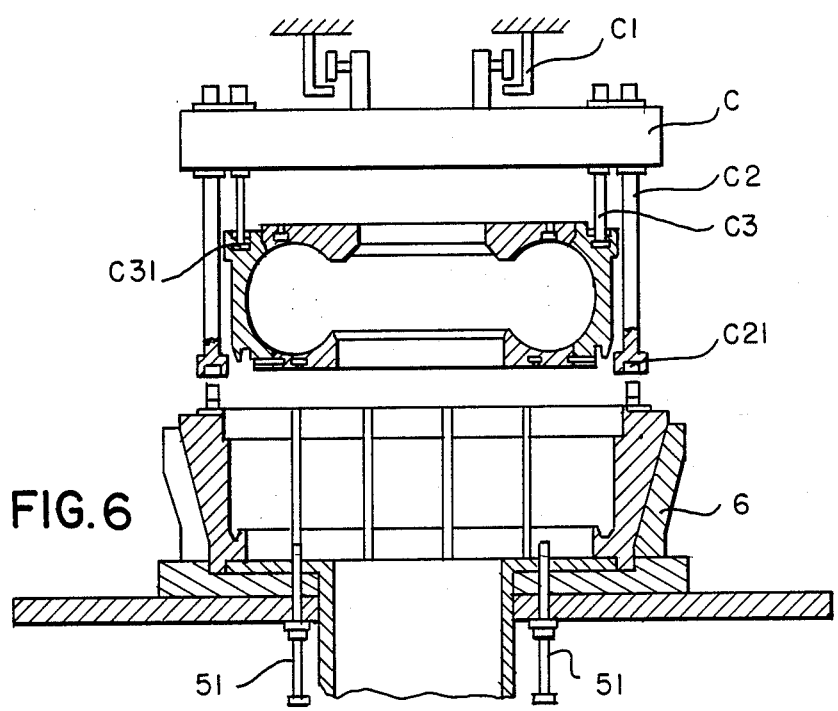
FIG. 6 illustrates, in a straight section, the mold of the invention during the phase of the substituting of the molds.

As far as the behavior of the mold during use, there are no particular considerations to be made. FIG. 5 illustrates the shutting of the mold phase, after a raw carcass P to be vulcanized is inserted in it.

It is noted that the device (10), disposed in an operative, or a working position blocks the matrix to its corresponding support while rendering the mold to be functionally quite identical to the already known molds.

The only contrivance necessary would be that of foreseeing, on the frame of the press, corresponding housing seats (50) for the device (10), disposed in a blocking position, for the purpose of guaranteeing the mold's complete shutability.

Let us suppose instead, that the phase of substituting the mold must be proceeded with.

After having unloaded the last of the vulcanized tires, the shutting of the press mold is effectuated and the mold is in the situation illustrated in FIG. 1.

At this point, with suitable action upon the driving means of the shafts (51 and 52), the cheeks are unscrewed from the frame of the press.

By way of example, and for the sake of aiding the description, we couuld suppose that the press (that may be of the type having a sector-guide ring), is connected to the base of the press. In this case, after having unscrewed the upper cheek from the press-lid, said latter can obviously be drawn away, and in this way leaving the vault of the press free.

Now, a suitable implement, for example, a wagon C, mobile upon rails C1, is taken to a position superimposing the press, coaxial with the mould.

The wagon C, is provided with a plurality of shafts C2, axially slidable parallelly to the mold axis and rotating around its own axis, provided with a head C21 opportunely shaped for coupling with the pins of the devices (10) in a way that is solid with the rotation.

Hence, the above-said shafts are lowered towards the mold and, as soon as they have coupled with the corresponding pins, they are caused to rotate at 90° substantially (FIG. 2), in such a way as to bring each fixing device (10) to an at rest position and thus, freeing the corresponding matrices.

Moreover, the wagon C is provided with a plurality of axially shiftable shafts C31 that are apt for penetrating into corresponding grooves (32) made on the matrices, and for remaining fixed to these same, through the means of the head rotating, for example, according to an arc of 90°.

Hence, these shafts C3 are coupled with the corresponding matrices (3), and fixed to these same through the means of the above-said rotation.

At this point, the shafts C3 are returned to the wagon and it is obvious that they drag along with them the entire mold, even if they may be reduced in numbers, of not less than two, but preferable of at least three, disposed at intervals of 120° one from the other, for reasons of balancing the weight of the mold.

In fact, from what has been previously described, it can be understood that the matrices are free to slide axially, with respect to their relative supports, while the lower cheek (1) is fixed to the matrices (3) through the upturned-T shaped cogging device and hence, it is raised successively to the lifting of the matrices which are fixed to the shafts C3 and their supports, while lifting along with itself the matrices that are not anchored with their corresponding shafts C3.

What is more, the upper cheek results as simply resting with its flanged edge on the crown of the matrices. But this suffices for giving compactness to the mould while rendering it to be a single piece, for the purpose of its movements.

As soon as the mold during the course of its being lifted upwards is free from any whatsoever interference of the press-frame, the wagon can be drawn away for taking the mold back to the store-room and for taking-up the mold that must be mounted in its place.

The operations of mounting the mold are exactly reverse to those just described and, at this point, they are so obvious that it is unnecessary to cite them.

Instead, it will be useless to point out the reason why the elimination is rendered important, of any whatsoever relative circumferential movement in-between cheeks and sectors, as was previously described.

First and foremost, it must be remembered that prior to its mounting on the press the mold is assembled on the work-bench while manually disposing the sectors against the pair of corresponding cheeks, that up to now seem to be able to be disposed at any whatsoever angular orientation with respect to the matrices.

Vice-versa, the devices for fixing the cheeks to the press (the shafts) are fixed in a well-defined position, which is unchangeable with respect to the press-frame, so much so that, even the cheeks are conditioned as far as concerns their angular orientation with respect to the press.

If the search for this precise angular position is effectuated when the mold is mounted upon the wagon, it would prove to be a long and a delicate operation to the detriment of the advantage which are attainable with this type of a mold, seeing that such operations would need a very sophisticated and hence, a very costly actioning wagon.

Therefore, according to the invention, it is sufficient to establish and maintain a well-defined relative angular positioning in-between the matrices and the cheeks (which is precisely the one imposed by the devices of FIGS. 3 and 4), for entirely solving even the problem described above. In fact, the shafts C2 and C3 are mounted on the wagon in such a way that, when the wagon is in a coaxial position to the mold (FIG. 6), the said shafts are aligned axially with the corresponding devices (pins 10 and grooves 32) on the said supports and the matrices.

The mold according to the invention has proved capable of solving all the problems faced, in a complete and efficacious manner, while realizing an apparatus that is more economical if compared to the already known ones, and while also rendering the operation of substituting molds, to be easier, more rapid and practically semiautomatic. In other words that the operation does not require any direct intervention on the press of the operator himself.

Practically speaking, if one considers that the mold to be mounted upon the press (in substitution of the molds presently being used), can be preheated to an adequate temperature (for example: 200° C.), in such a way as to be operative immediately after being installed, it can now be understood how the substituting of the molds has become an operation that practically does not interfere any longer with the productive capacity of the presses.

It can be understood also, that the present description was solely given by way of non-limiting example, seeing that the mold, in its complex whole, and its relative actioning procedures, are described while referring to the tire vulcanization and to a particular press i.e. that having a sector-guide ring fixed at its base, it becomes obvious that, anyone skilled in the art will have no difficulty in applying the present teaching to all other cases and types of machinery that are similar to those described, so much so that what must be considered as also being comprised within the ambit of the present patent are also all those modifications and alternative variations which, although not expressly described herein, are easy deducible from the present inventive idea.

What is claimed is:

1. A segmented vulcanizing mold for elastomeric or plastomeric toroidal articles, mountable and detachable from a press-frame, comprising:
   a first cheek and a second cheek being axially opposed to each other; said first cheek and said second cheek delimit the flanks of an article to be molded;

a crown of radially contractile and expansible sectors interposed between said first cheek and said second cheek which delimits a radially outer surface of the article to be molded, said crown of radially contractile and expansible sectors being contained in a holder ring solidly locked to said press-frame and the sectors comprising two connected pieces wherein a first connected piece is a matrix having a radially inner surface substantially corresponding to a portion of the crown surface of the article to be molded, and a second connecting piece is a support for the matrix having a radially outer surface inclined with respect to an axis of the mold, the matrix being freely movable with respect to a corresponding support in at least the axial direction along the mating surfaces between said matrix and said support; said support and a corresponding matrix therefor being operatively associated with one another through at least one fixing device that is alternatively shiftable between two operative positions, a first operative position being a working position wherein the matrix is solidly locked on the support and a second operative position being a rest position wherein the matrix and the support are freely movable with respect to one another.

2. The mold according to claim 1, wherein said first cheek and at least two matrices positioned diametrically opposed to said first cheek are operatively associated with a reciprocal coupling device, wherein when said mold is in a closed position said reciprocal coupling device provides for radial shifting and blocks axial and circumferential shifting between said matrices and said first cheek.

3. The mold according to claim 1, wherein said second cheek extends in the radial direction over the outer axially upper surface of the matrix when said mold is in a closed position, wherein said second cheek and at least one matrix is operatively associated with at least one reciprocal coupling device which provides for radial shifting and blocks circumferential shifting between the second cheek and the matrix.

4. The mold according to claim 1, wherein at least two matrices positiond in diametrically opposed positions have means for coupling with an implement which is capable of being raised with respect to the holder ring and the supports and allows a complex comprising the first and second cheeks and the interposed crown of matrices to be drawn away from the press-frame.

5. The mold according to claim 1, wherein said fixing device is alternatively shiftable between said two operative positions by rotation around its own axis.

6. The mold according to claim 5, wherein said fixing device is mounted on said support and is freely rotatable around an axis that is perpendicular to the axially outer surface of said support, wherein in said rest position said fixing device does not protrude radially outside of said support in the direction of the corresponding matrix.

7. The mold according to claim 1, wherein said fixing device comprises a substantially rectangular bar mounted on an axially upper surface of said support, said bar being provided with at least one end-peg upon the surface facing said support and said bar being further provided with a pin which is coaxial with the axis of rotation on the axially opposed surface.

8. The mold according to claim 7, further comprising elastically deformable means for maintaining said bar axially pressed against said outer surface of the support.

9. The mold according to claim 7, wherein the matrix has on its axially upper surface in correspondence with its radially outer edge a stop-peg which is positioned axially outward for engaging with said end-peg of said rectangular bar when said fixing device is in the working position.

10. The mold according to claim 9, wherein the end-peg and the stop-peg each have radially corresponding facing surfaces which are concave and convex, respectively, and wherein a bending radius of said concave surface is greater than a bending radius of the convex surface.

* * * * *